United States Patent [19]
Frie et al.

[11] 3,926,676
[45] Dec. 16, 1975

[54] BATTERY COMPRISING A PLURALITY OF CELLS

[75] Inventors: Wolfgang Frie; Burghard Grave; Karl Strasser; Heinrich Gutbier, all of Erlangen, Germany

[73] Assignee: Siemens Aktiengesellschaft, Munich, Gerlin, Erlangen, Germany

[22] Filed: Feb. 11, 1974

[21] Appl. No.: 441,339

Related U.S. Application Data

[63] Continuation of Ser. No. 227,948, Feb. 22, 1972, abandoned.

[30] Foreign Application Priority Data
Feb. 25, 1971 Germany............................ 2109034

[52] U.S. Cl................................. 136/86 R; 136/160
[51] Int. Cl.².......................................... H01M 4/86
[58] Field of Search........ 136/86 R, 160; 137/561 R

[56] References Cited
UNITED STATES PATENTS

| | | | |
|---|---|---|---|
| 2,190,944 | 2/1940 | Grimshaw | 137/561 R |
| 3,421,996 | 1/1969 | Coval et al. | 136/86 R X |

Primary Examiner—John H. Mack
Assistant Examiner—H. A. Feeley
Attorney, Agent, or Firm—Herbert L. Lerner

[57] ABSTRACT

A battery comprising a plurality of tightly interconnected electrochemical cells whose electrolyte supply is effected in parallel via common main inlet channels and main outlet channels, as well as supply channels at the individual electrolyte chambers. The cross section of the channels in the battery is such that in all electrolyte chambers, substantially the same operational pressure difference will prevail, between the inlet and outlet openings.

5 Claims, 9 Drawing Figures

BATTERY COMPRISING A PLURALITY OF CELLS

This is a continuation of application Ser. No. 227,948. Filed Feb. 22, 1972, now abandoned.

The present invention relates to a battery comprising a plurality of electrochemical cells which are tightly interconnected to one another. More particularly the invention relates to fuel cells or water removal cells, whose electrolyte supply is effected in parallel, via common main inlet channels and main outlet channels, as well as supply channels provided in the individual electrolyte chambers.

The electrolytic cells are generally combined into larger units in order to obtain a higher useful efficiency. These units, comprising a plurality of fuel cells, are called batteries. In fuel cells and batteries wherein hydrogen or hydrogen containing fuels are reacted with air or oxygen, as an oxidizing agent, water is produced as a reaction product and a certain amount of heat is released. The electrolyte liquid is used in the batteries primarily to remove the heat and the reaction water from the battery. The electrolyte liquid can be recycled and can be regenerated outside the battery in water removal cells. The heat formed is in this manner also removed from the battery. Approximately the same amount of heat must be withdrawn from each fuel cell of the battery to avoid temperature differences. This should be done so that the individual fuel cells of the battery are traversed by the electrolyte liquid in parallel to one another. The parallel guidance should, at the same time, provide a uniform supply of electrolyte liquid to all fuel cells.

A uniform supply of electrolyte liquid to all fuel cells of a battery is also desirable when fuel or oxidation means are dissolved in the electrolyte liquid. To obtain all these goals, it is desired to effect a uniform flow through of electrolyte to all fuel cells of a battery, which are connected in parallel.

This uniform flow, however, cannot be obtained solely by varying the pump efficiency or by varying the electrolyte channels. The described parallel guidance of the electrolyte liquid is not without problems as the electrolyte channels form electric shunts which results in losses and even lead to so-called leakage currents. When the electrolyte channels are enlarged, the successful pump capacity would be decreased, but the leakage output would rise due to rising leakage currents.

Water removal cells are known, for example from Austrian Patent No. 277,341. They comprise an electrolyte chamber connected into the electrolyte cycle of the fuel battery, at least one gas chamber and a coolable surface, adjacent to the gas chamber the coolable surface may be a part of a cooling chamber. Such water removal cells wherein the reaction water and the dissipated heat are removed from the electrolyte liquid, may be combined, like the fuel cells into larger units, the so-called "water removal" units which are here also called batteries, for the sake of simplicity. The electrolyte liquid is preferably supplied to a battery of water removal cells, so that all electrolyte chambers of said cells are traversed by the electrolyte liquid, parallel to each other. Such cells and batteries have therefore similar problems as the electrochemical cells, with respect to a uniform flow.

Such flow problems may also occur in cooling devices, e.g. plate heat-exchangers, through which the electrolyte liquid of electrochemical cells may pass, in order to remove heat. This cooling device may be formed of individual cells, which comprise an electrolyte chamber and a cooling chamber separated from the former, by a cooling surface. Since, in order to effect a uniform heat-removal, the electrolyte liquid is preferably passed in parallel through the electrolyte chambers of the individual cooling elements of the cooling device, the indicated flow problems in this case will also occur. Finally, the same problems occur also with the use of a cooling liquid, if this liquid is passed in parallel through the cooling chambers of a cooling device or, correspondingly, if cooling liquid is passed in parallel through the cooling chamber of the above-indicated water removal unit.

The passage of the electrolyte is effected in a battery comprising a plurality of electrochemical cells or water removal cells, preferably so that the electrolyte liquid is supplied from below, at the battery ends and removed from above. This applies, particularly, for fuel cells and for the use of diaphragms, which in the individual fuel cells, separate the electrolyte chambers from the gas chambers used for fuel and oxidation means. This electrolyte guidance for the arrangement of the electrolyte lines two possibilities.

The invention will be described with reference to several Figures and embodiments, wherein.

Figure 1A:
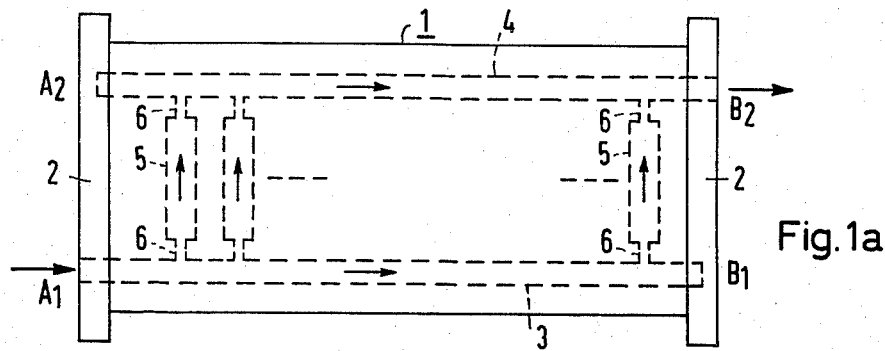
FIGS. 1a and 1b show, respectively and schematically, a section of a battery with bilateral and unilateral electrolyte connection.

FIG. 1a shows a possiblity for the flow and can be called a "bilateral" electrolyte connection. The electrolyte liquid is supplied to one battery end at $A_1$, passes through the battery and the electrolyte chambers in the direction indicated by the arrows and leaves the battery at the other end, at $B_2$. In a second possibility shown in FIG. 1b, i.e. a "unilateral" electrolyte connection, the electrolyte liquid enters the battery at $B_1$ and emerges therefrom at $B_2$.

Figure 2A:
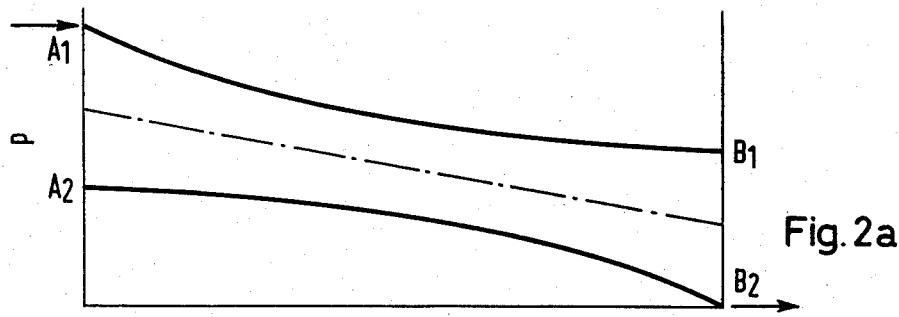
FIGS. 2a and 2b illustrate, respectively and schematically, the pressure curve in the batteries of FIGS. 1a and 1b assuming a linear flow theory.
Figure 2B:
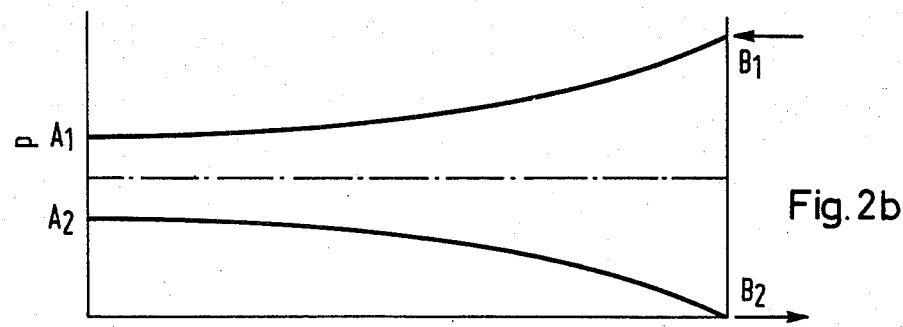

If a linear flow theory is applied for observing the electrolyte flow, the pressure distribution seen in FIGS. 2a and 2b, occur along the main channels of a battery. In the main inlet channel, the pressure gradient decreases in the flow direction of the electrolyte liquid, due to the reduced flow volume (the electrolyte liquid enters the supply channels of the individual electrolyte chambers from the main inlet channel) while conversely, the pressure gradient rises in the main inlet channel as the flow volume increases.

FIG. 2a shows, for linear flow theory, the pressure distribution with a bilateral electrolyte system, while FIG. 2b shows the pressure distribution with a unilateral electrolyte system. The distance between both curves determines the passage that is the flow volume through the individual electrolyte chambers.

FIGS. 2a and 2b show that irregularities occur within the battery with respect to the passage of the individual electrolyte chambers. Furthermore, it is seen that in the case of a unilateral electrolyte connection, based on a linear flow theory, the conditions are less favorable than with a bilateral electrolyte connection. Thus, with an increasing number of cells (abscissa of FIGS. 2a and 2b), the irregularities in flow direction become always more critical. Since, as previously explained, an enlargment of the main channels is precluded in electrochemical cells because of the rise in leakage losses connected therewith, a unilateral electrolyte connection would hardly be suitable under these conditions, at least for batteries comprising such cells.

Extensive theoretical tests and measurements have shown that the pressure conditions are subjected to many, non-linear influences which influence considerably the pressure distribution. These, primarily, are the effects which occur at the inlet and outlet openings, at the branches and at the confluences of the channels, and when the problem is treated mathematically enter into calculations as the square. These influences result in the fact that, even with larger batteries, a unilateral electrolyte connection is preferable.

It is an object of the invention to achieve an almost uniform pressure distribution in all electrolyte chambers for batteries comprising a plurality of tightly interconnected electrochemical cells, particularly fuel cells or water removal cells, whose electrolyte supply is effected in parallel, via common main inlet channels and main outlet channels, with supply channels for the individual electrolyte chambers. This means providing measures which produce an almost parallel trend of the pressure distribution curves, in the main channels. To this end, in accordance with the invention, the cross section course of the channels in the battery is such that at least almost the same operational pressure difference between the inlet and the outlet opening occurs at all electrolyte chambers.

The battery of the invention differs fundamentally from the heretofore known batteries, whose main channels are equally dimensioned and have a constant tubular cross section, meaning a constant diameter over the entire length of the battery, or that the supply channels are of equal size, in all cells. In the battery of the invention, the cross section curve of the main channels are such that all electrolyte chambers have at least almost the same pressure difference. The cross section of the supply channels which connects the electrolyte chambers of these cells with the main channels, can also be differently dimensioned in order to improve the variable flow through the individual cells. This type of action is limited, however, since the dimensioning must not be too small, because of the danger of clogging.

With the same dimensions of the supply channels, which connect the electrolyte chamber of each cell with the main inlet channel and with the main outlet channel, the pressure difference between the beginning and end of each electrolyte chamber can be measured at the entry points of its supply channels into the main channels. The cross section course of the main channels may be appropriately adjusted by testing and measuring the pressure difference at these points. If, on the other hand, the cross section of the supply channel is altered from cell to cell or in groups of plural cells, then the pressure difference can be measured in comparison cells, in dependence upon the volume flow. The results can be tabulated and then available for evaluation in dimensioning actual batteries.

Since the flow velocity of the electrolyte liquid constantly decreases in the main inlet channel, this provides a pressure gain, which becomes superimposed to the remaining components for pressure distribution, that is the pressure losses. In the main outlet channel, on the other hand, there is an increase of the flow velocity, which results in an additional loss of pressure. The total loss of pressure in the main inlet channel is thus less than in the main outlet channel. This asymmetrical distribution also results in the fact that without the planned features, which are carried out in the battery of the invention, the least passed-through cell of a battery with bilateral electrolyte connection, is not situated in the middle of the battery. To obtain a uniform pressure distribution at all cells, particularly in batteries with unilateral electrolyte connection, meaning the inlet and outlet for the electrolyte are situated on the same side of the battery, the cross section of the main outlet channel preferably can be larger than the cross section of the main inlet channel.

The variable pressure losses in the main channels, the pressure gain in the main inlet channel being approximately one third of the additional pressure loss in the main outlet channel, can preferably be balanced by a variable design of the cross sections of both main channels. A parallelism of both pressure distribution curves can also be obtained through the fact that the cross section of the main inlet channel decreases at least over several cells, in the direction from the point of entry into the battery. Further, the desired pressure distribution can also be obtained if the cross section of the main outlet channels increases over at least several cells, in the direction of the outlet point of the battery.

These measures are preferably taken so that the radii of the main channels are changed either constantly or stepwise. To this end, the openings in the frame parts of the individual cells, which serve for receiving the electrolyte may be differently dimensioned, for example, so that the desired course of the main channels is obtained after the battery is assembled. An almost parallel pressure curve can, furthermore, be preferably obtained by inserting profiled bodies into the main channels.

Figure 1B:
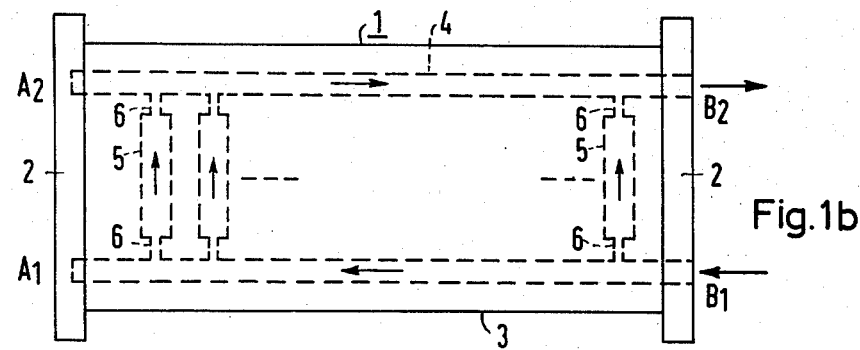

In FIGS. 1a and 1b, 1 is the battery housing and 2 the end plates of the battery. The bilateral electrolyte battery illustrated in FIG. 1a, the electrolyte flows into the battery or its main inlet channel 3 at $A_1$ taken the course within the battery, indicated by the arrows, through the electrolyte chambers of the cells, e.g. fuel cells, the supply lines 6, the main outflow channel 4, and leaves the battery at $B_2$. In the unilateral electrolyte battery shown in FIG. 1b, with the electrolyte liquid enters the battery, passes through the main inlet channel 3, the electrolyte chambers 5 and the supply lines 6, the main outlet channel 4 and emerges from the battery at $B_2$.

Based upon linear flow theory, the pressure curve of the batteries of FIGS. 1a and 1b, should, respectively, show the same course illustrated in FIGS. 2a and 2b, respectively. FIG. 2a shows schematically the pressure curve in a battery, with bilateral electrolyte connection, wherein the electrolyte liquid enters the battery at $A_1$ and emerges from the battery at $B_2$. FIG. 2b shows schematically the pressure curve in a battery with unilateral electrolyte connection, wherein the electrolyte liquid enters the battery at $B_1$ and leaves the battery, at $B_2$. These Figures show clearly that the pressure curve across the entire length of the battery (abscissa of FIGS. 2a and 2b) varies, that is a variable pressure difference occurs in each cell between the beginning and the end of the electrolyte chamber.

Figure 3:
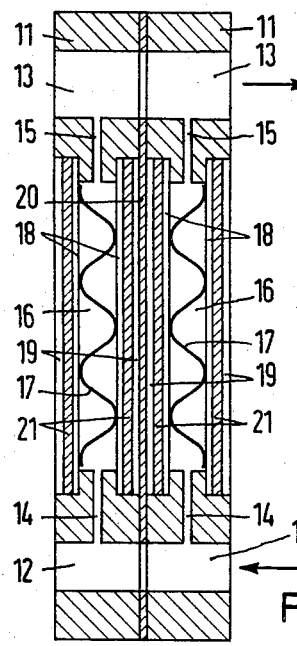
FIG. 3 is a schematic illustration, in section, of two fuel cells of one embodiment of the battery, according to the invention.

FIG. 3 illustrates, schematically, two fuel cells which can be used in an electrochamical cell battery according to the invention. The battery can be designed as illustrated in FIGS. 1a and 1b. The frames 11 of the fuel cell elements contain openings 12 and 13, in the form of bores, which define the main electrolyte channels in the battery. The bores 12 define for example the main inlet channel and the bore 13 the main outlet channel. For the sake of clarity, the means for sealing the component parts of the channel at the boundary between the two fuel cells are not shown. The main inlet channel has a smaller cross section than the main outlet channel. The direction of the electrolyte flow is indicated by arrows. The connection between the main channels 12 and 13 is provided by lower electrolyte supply channels 14, the electrolyte chambers 16 and the upper electrolyte supply channels 15. Nets or screens 17 inserted into the electrolyte chambers 16 serve to support asbestos diaphragms 18, which border the electrolyte chambers. Sealing the asbestos diaphragms are the electrodes 21, for example in form of bound, pulverulent catalyst material, which in turn is followed by gas chambers 19. Both gas chambers of each fuel cell are supplied with fuel or oxidation agents. The inlets and outlets for the fuel and oxidation agents of the individual fuel cells, or to their gas chambers for the sake of simplicity, are not shown in the drawings, Both fuel cells are separated from each other, by a contact plate or sheet 20, which is used to collect the current.

The preferred effects of the invention will be explained with reference to a battery produced of 30 such fuel cells. The fuel cells have a synthetic frame, which is 5 mm thick and has bores for the electrolyte liquid and the reaction gases. The end plates of the battery are 28 mm in thickness. The fuel cells contain, e.g. bound electrodes of Raney catalysts (TROISIEMES JOURNEES INTERNATIONALES d'ETUDE des PILES a COMBUSTIBLE, COMPTES RENDUS, Brussel, 1969, pages 191–193). The electrolyte chambers are 175 mm wide, 168 mm high and have a thickness of 1.7 mm. They are lined with electrolyte resistant screens, which support the adjacent asbestos diaphragms. The supply channels for the electrolyte are 1 × 2.4 × 14.5 mm. The contact sheets between the frames of the fuel cells are 0.3 mm thick. The electrolyte liquid is 6 n KOH, at a temperature of 70° to 80°C. Each fuel cells delivers a voltage of about 0.7 volt.

Figure 4:
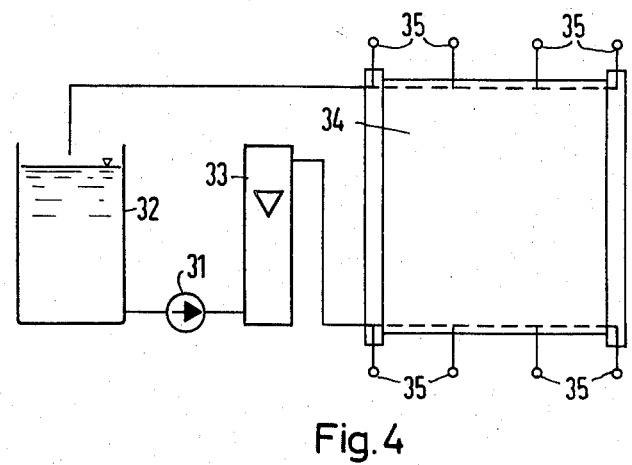
FIG. 4 is a schematic illustration of a device, which measures the pressure curve at a battery with unilateral electrolyte connection.

The pressure distribution is determined by a measuring device, as is shown in FIG. 4. This measuring device can also be used for batteries of other cells. The electrolyte liquid is cycled via pump 31. The electrolyte cycle encompasses a thermostatic electrolyte storage container 32, a floating flow meter 33, and the battery 34. Four pressure delivering points 35 in each of the two main channels, are used for measuring the hydrostatic pressure of the electrolyte liquid. The main inlet channel and the main outlet channel contain one measuring point, in each of the end plates, meaning a measuring point ahead of the first fuel cell of the battery and a measuring point, behind the last fuel cell. Both remaining measuring points, provided for each main channel, are situated behind each tenth fuel cell. To this end, one "blind frame", i.e. a frame with blocked electrolyte supply channels, is installed into the battery between the 10th and 11th fuel cells and between the 20th and 21st fuel cells and is provided with pressure delivery points. Each of the pressure delivery points is connected, respectively, with one measuring tube of a multiple manometer. The measuring arrangement shown in FIG. 4, shows the measurement of a battery with unilateral electrolyte connection. However, it can also be used for a bilateral electrolyte connection if the battery is accordingly designed.

Figure 5:
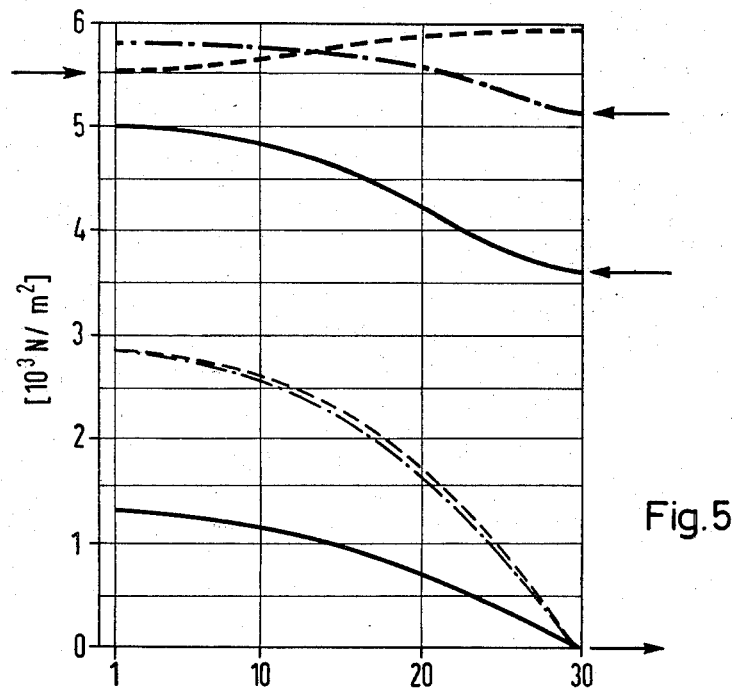
FIG. 5 is a graphic illustration of a pressure curve of batteries with different electrolyte connections and a different design of the main channels.

FIG. 5 shows the pressure distribution between main inlet channels and main outlet channels, in three batteries with variable electrolyte connections and with a variable cross section for the main channels. The total volume flow through the battery is 62 cm³/sec. meaning about 2.1 cm³/sec. per fuel cell.

If the battery has a bilateral electrode connection and if the radii of the two main channels are equal, the radius of the main inlet channel being $r_e$ = radius of the main outlet channel $r_a$ = 3.72 mm, then both curves have a divergent course shown by the dashed/lines in FIG. 5. The difference in the flow through individual fuel cells is up to 52%. The electrical leakage capacity amounts of 15.6 Watt.

If the battery has a unilateral electrolyte connection, when the radii of the main channels are equal ($r_e = r_a$ = 3.72 mm), the pressure distribution curves will show a course curved in the same direction (dot-dashed lines, in FIG. 5), but the amount of the pressure difference at the main inlet channel (upper dot-dash line) will be smaller than the amount of pressure difference at the main outlet channel (lower dot-dash line). The flow variation, that is the difference in the passage through the individual fuel cells, in this case amounts to up to 35%. The electrical leakage capacity is, as above, 15.6 Watt.

In a number of other investigations, the battery was equipped according to the invention. At a unilateral electrolyte connection, the main inlet channel has a smaller radius than the main outlet channel: $r_e$ = 2.94 mm, $r_a$ = 4.58 mm, a ratio of approximately .64. The main channels are so dimensioned that the losses in electrical leakage capacity do not rise at least compared to the above-described examples. The losses in electrical leakage capacity remain unchanged up to 15.6 Watt. The pressure distribution curves (solid lines in FIG. 5) now show a widely parallel course. The flow variation is at the most only 3%.

The illustrated, preferred effect of the battery according to the invention can be further increased by an optimum dimensioning of the main channel. In any case, a far-reaching equal distribution for the passage through the batteries is insured. The favorable effect of the batteries according to the invention, is shown in the embodiments with reference to batteries of fuel cells. It is again pointed out that this applies as well to batteries of other, electrochemical cells and also to batteries of water removal cells, meaning water removal units.

An additional improvement or a general improvement of the flow can also be obtained by inserting profiled bodies into the main channels. The use of profiled bodies is particularly preferred for batteries with bilateral electrolyte connection, since in this case, the pressure distribution curves will have an opposite curve course, as shown in FIG. 5.

Figure 6:
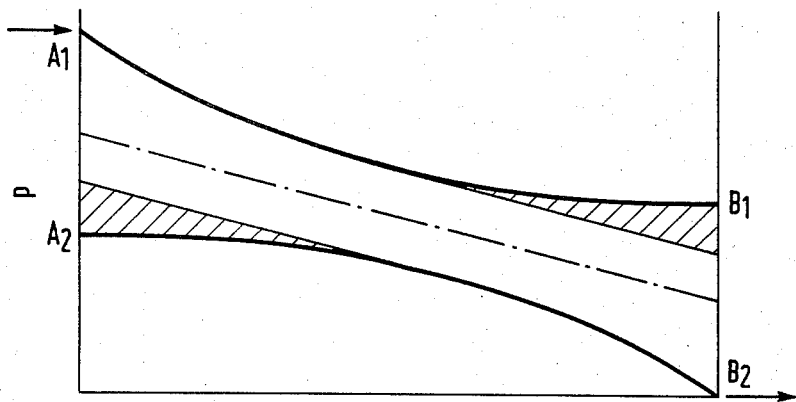
FIG. 6 shows in graphic illustration, the effect of profiled bodies upon the pressure curve in the main channels.

FIG. 6 shows by the hatched area, how an almost uniform course of the pressure distribution curves can be obtained for a battery with bilateral electrolyte connection, by using profiled bodies. The profiled bodies can be arranged in the main inlet channel and in the main outlet channel. The shape and expansion of the profiled bodies can be adjusted to the individual batteries, by establishing with the aid of the above-described measuring methods, which cross section curve of the main channels is optimal for the respective battery.

Figure 7:
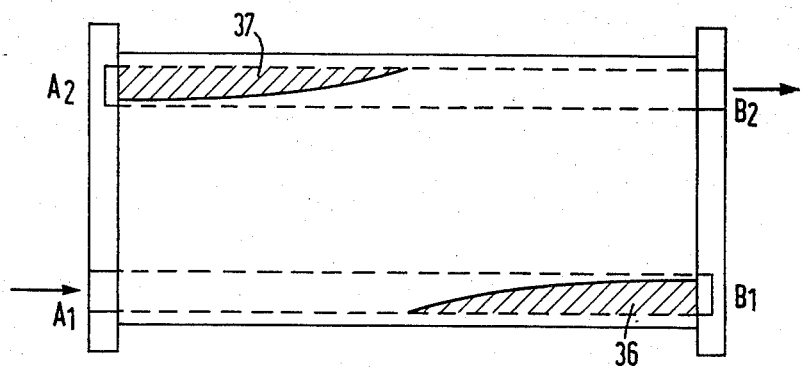
FIG. 7 shows the arrangement of such profiled bodies in the main channels.

FIG. 7 indicates such profiled bodies in the main channels, by the numerals 36 and 37.

The executed measurements and the already indicated extensive mathematical calculations read to corresponding results for the pressure distribution in the main channels. The following results are the most important:

1. At equal geometrical dimensions of the main channels, the pressure difference at the main inlet channel (between $A_1$ and $B_1$) is smaller than the pressure difference at the main outlet channel (between $A_2$ and $B_2$).
2. The main inlet channel has regions wherein the pressure does not decrease in flow direction but increases. In these regions, conventional pressure losses are over compensated by pressure gains.

The results achieved also show that the pressure curve is not linear and that a unilateral electrolyte connection may be more favorable than a bilateral electrolyte connection. A unilateral electrolyte connection is preferably employed when a pressure gain occurs in the main inlet channel. To ascertain when a pressure gain will occur in the main inlet channel, and thus whether the unilateral electrolyte connection will bring advantages over the bilateral electrolyte connection, one can use the following formula which is the result of an extensive mathematical treatment of this problem:

$$r_e > \frac{n \cdot \frac{\lambda}{4} \cdot 1}{1 - \frac{12\pi \eta l}{\rho \cdot V}}$$

wherein:
$r_e$ = radius of the main inlet channel (in cm);
$n$ = number of cells in the battery;
$\lambda$ = a dimensionless constant which represents the turbulent component of the flow; in a smooth tube, the value of is $2 \cdot 6 \cdot 10^{-2}$;
$l$ = the thickness of the frame of a cell (in cm);
$\eta$ = viscosity of the electrolyte liquid (in g/cm·sec);
$\rho$ = density of electrolyte liquid (in g/cm$^3$);
$V$ = median volume flow per cell (in cm$^3$/sec).

The formula gives information about the minimum radius, which the main inlet channel shall have in order to use with success, a unilateral electrolyte connection in a battery. The formula applies in its above illustrated form for smooth channels, with constant cross section and represents a simplified form of a generally valid formula.

The above explained considerations and investigations as well as the performed measures are not limited to electrochemical cells and water removal cells but can always be used when similar problems of a variable pressure distribution occur. As previously stated, this applies to cooling devices. Moreover, the illustrated features are not limited to a liquid supply line but can be used analogously, for problems connected with a gas supply system.

Water removal cells as used hereinabove are also known as water depletion cells.

What is claimed is:

1. In a battery utilizing an electrolyte, comprising means defining a plurality of tightly interconnected electrochemical cells or water removal cells, each of said cells having an electrolyte chamber connected to a supply passage and a discharge passage, a main inlet channel communicating with each of said supply passages, a main outlet channel communicating with each of said discharge passages whereby electrolyte flow is effected in parallel to each of said electrolyte chambers; said main inlet channel and said main outlet channel each having a constant uniform cross-sectional area along its length, said main outlet channel having a larger cross-sectional area than said main inlet channel, so that substantially the same operational pressure difference prevails between the supply passage and the respective discharge passage of each of said electrolyte chambers.

2. In a battery according to claim 1 wherein the ratio of the radius of said main inlet channel to the ratio of said main outlet channel is about 0.64.

3. In a battery according to claim 1 wherein the main inlet channel has a radius of about 2.94 mm and the main outlet channel has a radius of about 4.58 mm.

4. The battery according to claim 1, including an inlet means leading to said main inlet channel, and an outlet means leading from said main outlet channel, said inlet means and said outlet means being disposed on the same side of said battery.

5. A battery according to claim 1 wherein the supply channels have different cross-sections.

* * * * *